Figure 1:
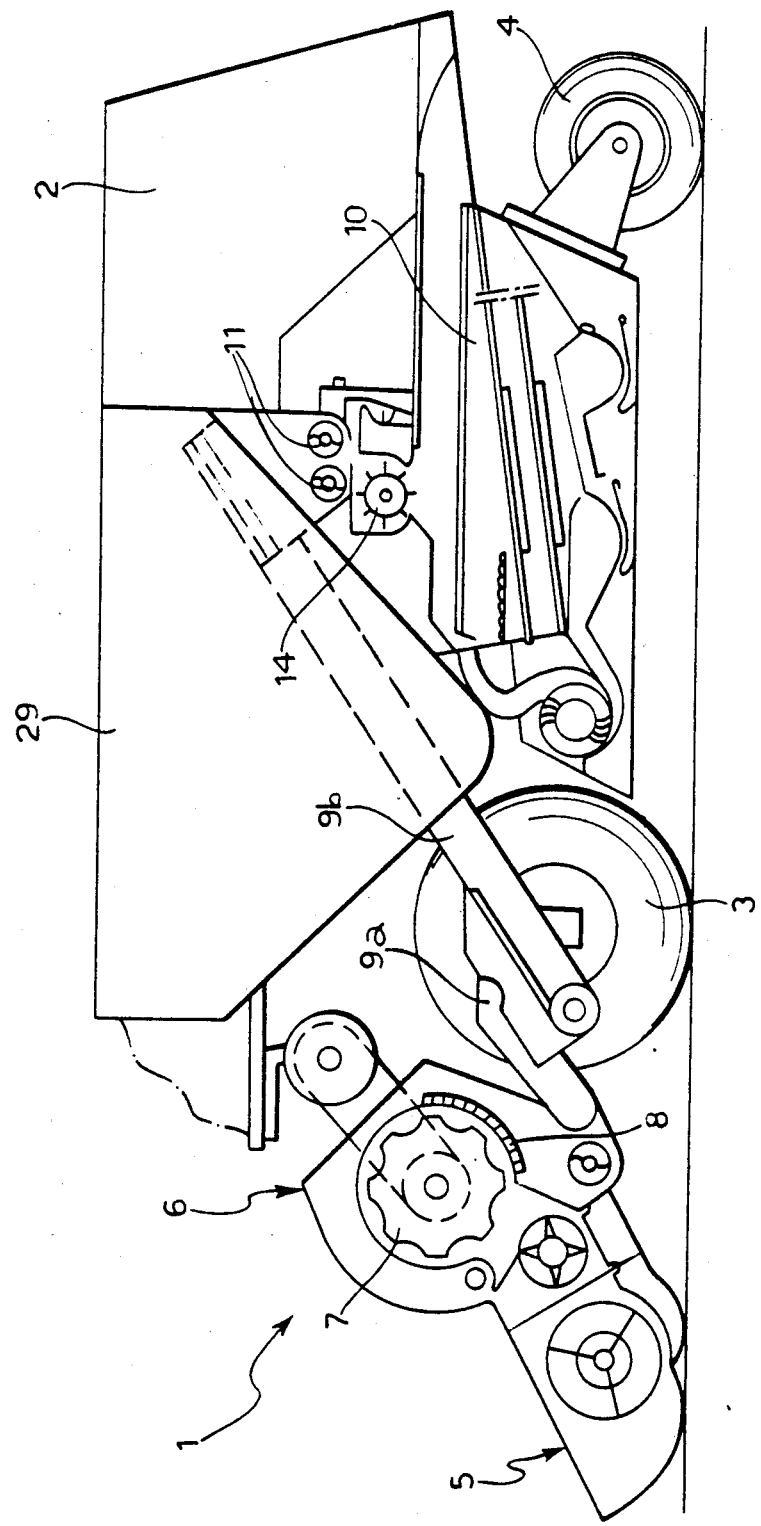

United States Patent [19]

Raineri

[11] Patent Number: 4,573,483

[45] Date of Patent: Mar. 4, 1986

[54] COMBINE HARVESTERS

[75] Inventor: Giuseppe Raineri, Bassano del Grappa, Italy

[73] Assignee: Pietro Laverda S.p.A., Breganze, Italy

[21] Appl. No.: 625,165

[22] Filed: Jun. 27, 1984

[30] Foreign Application Priority Data

Nov. 30, 1983 [IT] Italy .............................. 68257 A/83

[51] Int. Cl.⁴ ............................................. A01F 12/30
[52] U.S. Cl. ............................. 130/27 AE; 130/27 Q
[58] Field of Search ......... 56/14.6; 130/27 R, 27 AE, 130/27 T, 27 H, 27 HA, 27 Z; 209/416, 261

[56] References Cited

U.S. PATENT DOCUMENTS

| 2,189,706 | 2/1940 | Clipston | 130/27 AE |
| 2,310,610 | 2/1943 | Bissell | 130/27 AE |
| 2,682,951 | 7/1954 | Hamburg | 130/27 AE |
| 4,399,825 | 8/1983 | Raineri | 130/27 S |

Primary Examiner—Gene Mancene
Assistant Examiner—David I. Tarnoff
Attorney, Agent, or Firm—Sughrue, Mion, Zinn, Macpeak and Seas

[57] ABSTRACT

In a combine harvester of the axial-flow type provided with a roller for accelerating the fall of the produce onto the cleaning unit, deflectors are provided for deflecting the accelerated flow of produce towards the higher side of the machine when the latter is tilted sideways.

3 Claims, 4 Drawing Figures

COMBINE HARVESTERS

The present invention relates to combine harvesters of the known type comprising:
a threshing unit,
a pair of contra-rotating transverse distributor screws for discharging downwardly the produce received from the threshing unit and distributing it over the entire width of the machine,
a transverse accelerator roller situated below the two distributor screws to accelerate the fall of the produce,
a substantially vertical, fixed transverse wall adjacent the accelerator roller and adapted to cooperate with the latter to enable the acceleration of the produce,
a cleaning unit situated below the accelerator roller, including a shaking box with at least two screens lying one above the other, and means for directing a current of air at the produce accelerated by the accelerator roller and the produce which falls onto the cleaning screens, in order to cause the separation of the lighter material from the heavier grains.

A combine harvester of the type described above is described and illustrated in Italian Utility Model Application No. 53561-B/81 and in the corresponding European Patent Application No. 0 073 179.

In the case of this known machine, when the machine works on sloping land and is tilted sideways, the cleaning screens are overloaded on the lower side and cannot properly fulfil their function.

In order to prevent this disadvantage, the present invention has as its subject a combine harvester of the type specified above, characterised in that means are provided for deflecting the flow of the produce from the accelerator roller towards the higher side of the machine when the latter is tilted sideways.

In one preferred embodiment, the said deflecting means include a series of deflector blades located below the accelerator roller and freely articulated to the fixed structure of the machine about substantially vertical axes, a pendulum sensor device for detecting any lateral tilting of the machine, and a mechanical drive interposed between the pendulum sensor device and the deflector blades in order to effect rotation of the blades towards the higher side of the machine when the latter is tilted sideways.

Figure 2:
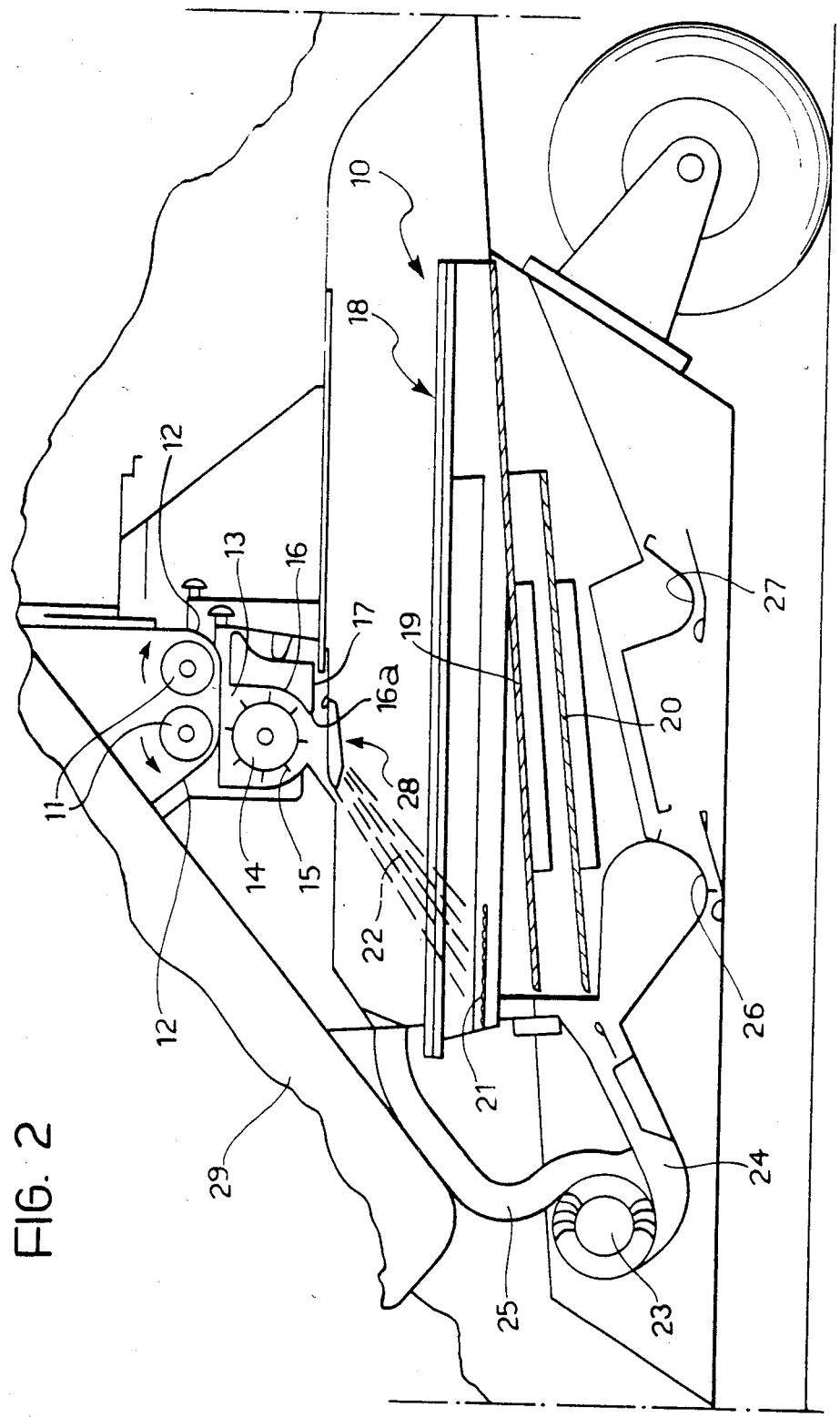
Figure 3:
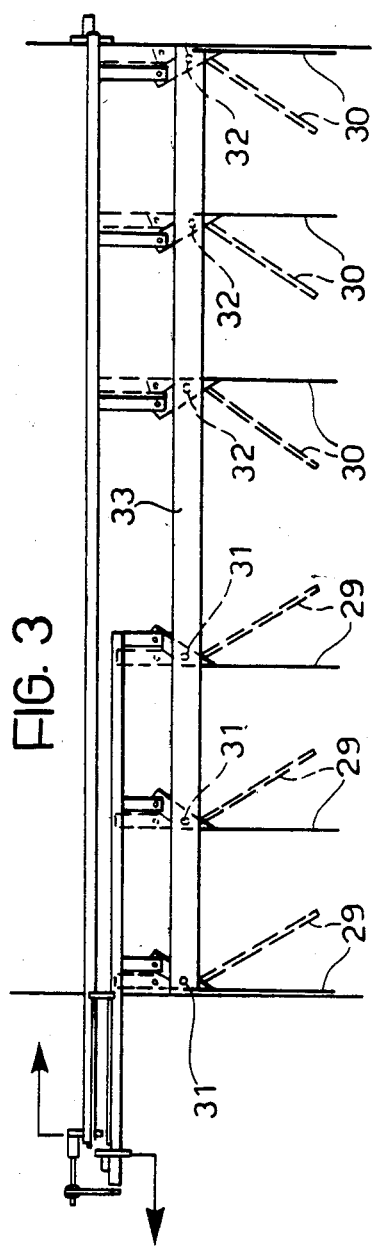
Figure 4:
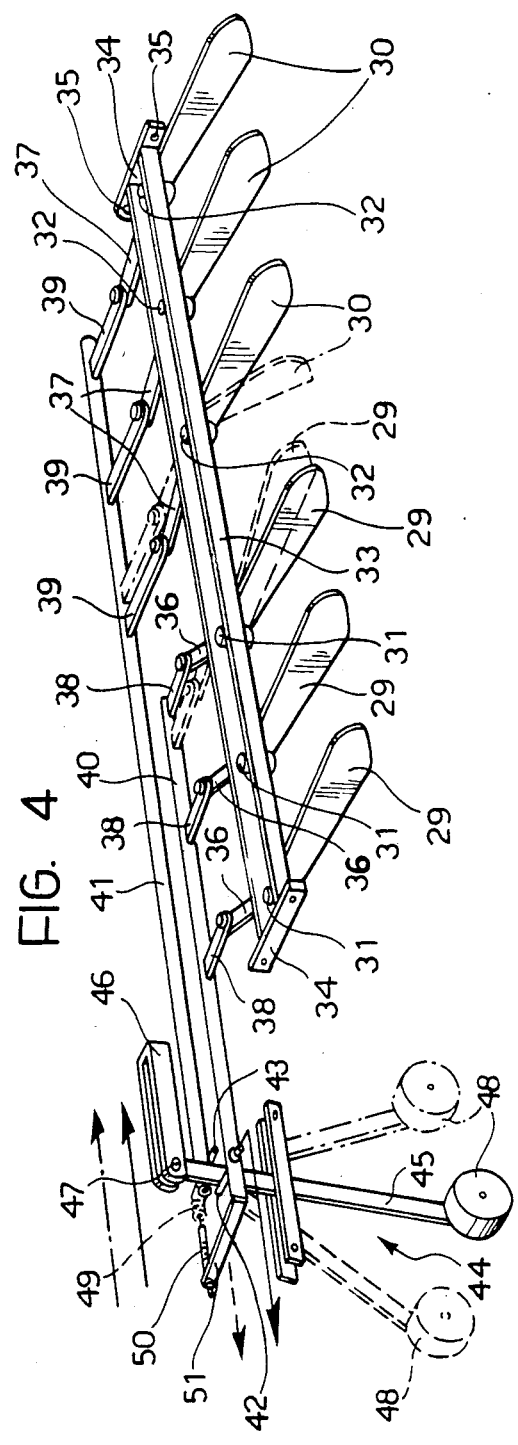

Further characteristics and advantages of the present invention will emerge from the description which follows with reference to the attached drawings, supplied purely by way of non-limiting example, in which:

FIG. 1 is a diagrammatic side elevational view of a combine harvester according to the invention, FIG. 2 illustrates a detail of the machine of FIG. 1 on an enlarged scale, FIG. 3 is a plan view of a detail of FIG. 2 on an enlarged scale, and FIG. 4 is a perspective view of the detail of FIG. 3.

In FIG. 1, a combine harvester, generally indicated 1, has a fixed structure 2 mounted on front wheels 3 and rear wheels 4. At the front of the combine harvester there is provided a cutting platform 5 and a threshing unit 6 including a threshing cylinder 7 of the axial-flow type and a thresher concave 8. Two conveyors 9a, 9b arranged in series with each other are provided to convey the produce leaving the threshing unit 6 to the cleaning unit of the machine, generally indicated 10.

The general structure of the combine harvester illustrated in FIG. 1 is described in detail in the earlier Italian Utility Model Application No. 53321-B/80 filed by the same Applicant, and in the corresponding European Patent Application No. 0 042 824.

Below the discharge end of the conveyor 9b are arranged two contra-rotating transverse distributor screws 11.

With reference to FIG. 2, the two distributor screws 11 are adjacent two walls 12 which form part of the fixed structure 2 of the machine and are situated below the screws. The mutually facing edges of the two walls 12 are spaced from each other to define an aperture 13 below the two screws 11.

The detailed construction of the preferred form of realization of the screws and the fixed structure associated therewith is described in the aforementioned Italian Utility Model Application No. 53561-B/81 and in the corresponding European Patent Application No. 0 073 179.

The two distributor screws 11 are adapted to distribute the material leaving the conveyor 9b over the entire width of the machine and to make the material drop through the transverse aperture 13.

In the present description and in the claims which follow, the expression "transverse" refers to a direction perpendicular to a longitudinal vertical plane of the machine.

An accelerator roller 14 is rotatably mounted about a transverse axis below the two distributor screws 11 for accelerating the fall of the produce distributed by the screws 11.

The preferred form of realization of this accelerator roller is also described in the European Patent Application No. 0 073 179 cited above. The accelerator roller 14 is provided with a series of axial ribs 15, preferably constituted of rubber, which cooperate with a substantially vertical, fixed transverse wall 16 to accelerate the fall of the produce towards the bottom.

The wall 16 forms part of a box element 17 fixed to the structure of the machine by any known method (for example, in the way described in the European Patent Application No. 0 073 179).

The lower part of the fixed transverse wall 16, indicated by reference numeral 16a, is shaped so as to incline the flow of the produce accelerated by the roller 14 with respect to a vertical transverse plane. In the example illustrated, the flow of produce emerging from the roller 14 is inclined towards the front part of the machine.

The cleaning unit 10 includes a shaking box 18 of the conventional type having a pair of superimposed cleaning screens 19, 20. The shaking box 18 is also provided with an integral table 21 situated above and in front of the cleaning screens 19, 20, in an area towards which the inclined flow (indicated by the reference numeral 22) of the produce from the roller 14 is directed.

A fan 23 is intended to direct a flow of air through respective ducts 24, 25 leading to the area of the cleaning screens 19, 20 and to the area of the inclined flow of produce 22.

Below the cleaning screens 19, 20 are arranged a collection bed 26 in which the cleaned grain is collected and from which the latter is transferred to the grain tank 29 with which the machine is provided, by means of a conveyor or device of a known type (not illustrated), and a collection bed 27, for reclaimed material. The material collected on the bed 27 is transferred back to the transverse screws 11 by means of the conveyor device of a known type (not illustrated) to undergo a further cleaning cycle.

During operation, the material leaving the conveyor 9b is distributed over the entire width of the machine by the transverse screws 11 and falls through the aperture 13 in the space between the wall 16 and the accelerator roller 14, where it is accelerated by the latter into a flow which is deflected by the lower part of the wall 16 in the manner illustrated in FIG. 2.

The deflected and accelerated flow of the produce is subjected to the current of air from the duct 25, as a result of which the lighter material is separated from the heavier grains and is deposited on the ground below the machine. The material which falls onto the shaking table 21 is transferred from there to the cleaning screens 19, 20 where it is subjected to the current of air from the duct 24, which causes a further separation. The grain arriving on the collection bed 26 is conveyed to the grain tank with which the machine is provided, whilst the material arriving on the collection bed 27 is returned to the distributor screws 11 in order to be subjected to a further cleaning cycle.

Unlike the known solution illustrated in the European Patent Application No. 0 073 179, no further surfaces for the collection of material are interposed between the accelerator roller 14 and the shaking box 18, which makes it possible to use all the space below the roller for the air-separation. The extent of the air-separation area is further increased due to the fact that the flow of produce leaving the roller 14 is not contained in a vertical plane but is inclined towards the front of the machine.

Below the accelerator roller 14 there is situated a deflector unit 28 the function of which is to deflect the produce leaving the roller 14 towards the higher side of the machine when the latter is tilted sideways, in order to ensure a uniform distribution of the produce over the entire width of the cleaning screens 19, 20.

The deflector unit 28 comprises two series of deflector blades 29, 30 (see FIGS. 3 and 4) which are articulated about vertical axes 31, 32 to a transverse element 33 having end flanges 34 secured by means of bolts 35 to the structure of the machine. The deflector blades 29, 30 are provided with appendages 36, 37 which project from the part opposite the active part of each deflector blade relative to the transverse element 33. The appendages 36, 37 are, in turn, articulated to projections 38, 39 forming parts of two rods 40, 41.

The rods 40, 41 are provided at one of their ends with striker pins 42, 43 intended to cooperate with a pendulum sensor device 44 for detecting lateral tilting of the machine.

The sensor device 44 comprises a rod 45 having its upper end articulated about a longitudinal pin 47 to a support 46 forming part of the fixed structure of the machine, and a mass 48 connected to the lower end of the rod 45.

When the combine harvester is tilted sideways, the pendulum constituted by the rod 45 and the mass 48 swings about the pin 47, moving away from its neutral vertical position and adopting one of the two positions illustrated with broken outline in FIG. 4. Following the movement of the pendulum away from its neutral central position, the rod 45 comes into contact with the striker pin 42 or striker pin 43, causing a consequent axial displacement of the rod 40 or the rod 41. The displacement of one of these rods causes the rotation of the corresponding series of deflector blades 29 and 30 in the direction of the higher side of the machine.

In this way, due also to the fact that the deflector blades, 29, 30 are disposed in planes which are inclined relative to the vertical plane upon tilting of the machine, the produce which hits these blades is directed towards the higher side of the machine. It is also notable that, with the device described above, only that portion of produce which would tend to fall to the lower side of the machine is deflected towards the higher side.

The deflector blades 29, 30 are maintained in their neutral position parallel to the vertical longitudinal plane of the machine by a helical spring 49 which is interposed between one end of the rod 41 and a pin 50 connected by means of a bracket 51 to the end of the other rod 40. The pin 50 is connected to the bracket 51 by means of threaded coupling, so as to allow adjustment of the load of the spring 49.

Naturally, without prejudice to the principle of the present invention, the particulars of construction and the forms of embodiment may be varied widely with respect to what has been described and illustrated purely by way of example, without thereby departing from the scope of the present invention.

I claim:

1. A combine harvester comprising:
   a threshing unit;
   a pair of contra-rotating transverse distributor screws for discharging downwardly produce received from the threshing unit and distributing it over the entire width of the harvester;
   a transverse accelerator roller disposed below the two distributor screws to accelerate the fall of the produce;
   a substantially vertical, fixed transverse wall located adjacent the accelerator roller and adapted to cooperate with the later to enable the acceleration of the produce;
   a cleaning unit disposed below the accelerator roller and including a shaking box with at least two cleaning screens lying one above the other;
   means for directing a current of air at the produce accelerated by the accelerator roller and the produce which falls onto the cleaning screens; and
   means for deflecting the flow of produce accelerated by the accelerator roller toward the higher side of the harvester when the harvester is tilted sideways;
   said deflector means including two series of deflector blades pivoted on a fixed structure of the harvester and extending below said accelerator roller for lateral pivotal movement about substantially vertical axes, each series of blades being disposed on opposite sides of the center of the harvester with each series of blades being moveable independently of the other series of blades, a single pendulum sensor device adapted to detect any lateral tilting of the combine harvester and a mechanical drive interposed between the single pendulum sensor device and each series of deflector blades to effect rotation of the lower series of blades toward the higher sides of the combine harvester while preventing rotation of the higher series of blades when the harvester is tilted sideways.

2. A combine harvester as defined in claim 1, wherein said pendulum sensor device comprises a rod articulated at its upper end to the fixed structure of the harvester about a longitudinal axis, and a mass supported by the lower end of said rod, and wherein each said mechanical drive comprises a respective rod connected to the deflector blades of each series, and a striker member on each rod for cooperating with the rod of said sensor device.

3. A combine harvester as defined in claim 2, wherein resilient means are provided to bias the deflector blades into a neutral position parallel to the vertical longitudinal plane of the harvester.

* * * * *